Aug. 17, 1965  H. E. LA ROCK, SR  3,200,736
LIQUID MIXING APPARATUS
Filed May 24, 1962  4 Sheets-Sheet 1

INVENTOR.
HAROLD E. LA ROCK SR.
BY *Joseph G. Werner*

ATTORNEY

Aug. 17, 1965    H. E. LA ROCK, SR    3,200,736
LIQUID MIXING APPARATUS
Filed May 24, 1962    4 Sheets-Sheet 2

INVENTOR.
HAROLD E. LA ROCK SR.
BY Joseph G. Werner
ATTORNEY

INVENTOR.
HAROLD E. LA ROCK SR.
BY Joseph G. Werner
ATTORNEY

INVENTOR.
HAROLD E. LA ROCK SR.
BY Joseph G. Werner

ATTORNEY 3,200,736
LIQUID MIXING APPARATUS
Harold E. La Rock, Sr., 512 Menomonie St.,
Eau Claire, Wis.
Filed May 24, 1962, Ser. No. 197,440
7 Claims. (Cl. 99—275)

This invention relates to liquid mixing apparatus, and particularly relates to such apparatus for the mixing of root beer and other beverages.

It is a primary object of my invention to provide a device for mixing liquids which will produce a uniform, high quality beverage.

It is a further object of my invention to provide a device for mixing which is extremely compact, and is relatively inexpensive.

It is a still further object of my invention to provide a device for mixing liquids which may be quickly and easily disassembled and cleaned to comply with increasingly stringent health requirements.

It is an additional object of my invention to provide a device for mixing liquids which is capable of high capacity operation but requires only a small amount of such liquids to be prepared in advance.

It is another object of my invention to provide a device for mixing liquids to produce a high quality beverage, which device is sufficiently compact to allow counter installation thereof.

Other objects and advantages will be readily apparent from the following detailed explanation taken in conjunction with the accompanying drawings wherein a preferred embodiment of the principles of the invention has been selected for exemplification.

Figure 4:
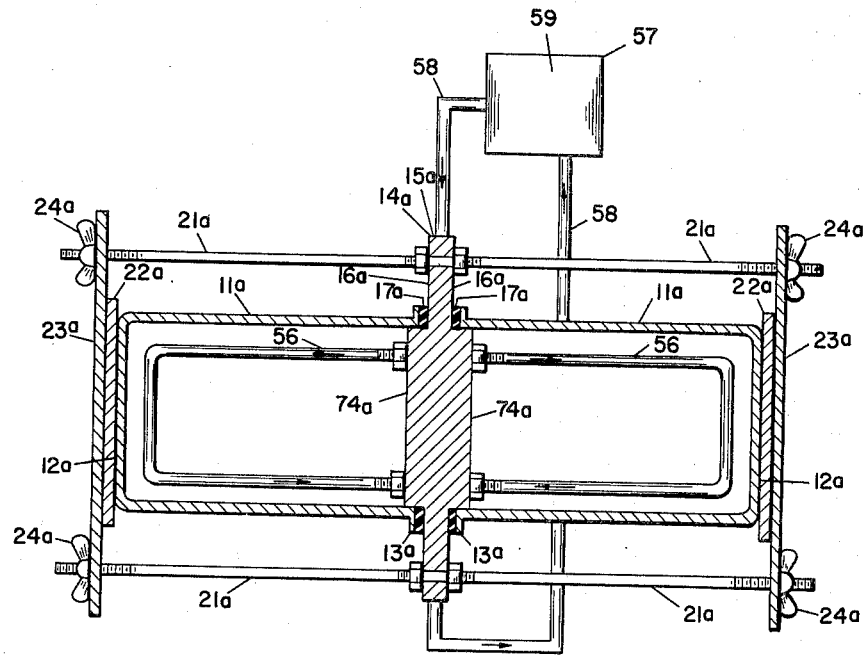
FIG. 4 is a section view of a modification of my invention taken along section 4—4 of FIG. 3.
Figure 5:
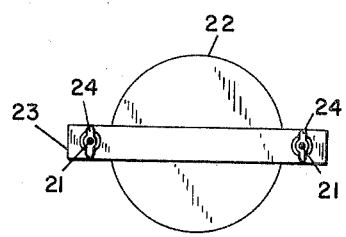
FIG. 5 is an end view of the locking members for my invention taken in the direction of line 5—5 in FIG. 1.

Referring more particularly to the drawings, wherein like numerals refer to like parts, my mixing device 10 may include a pair of opposed rigid canisters 11 which are separated by a head portion 14 to form tank means. Each of the canisters 11 has a closed end 12 and an open flanged end 13. The head portion 14 has an outer surface 15, which is preferably cylindrical in shape, and a pair of opposed faces 16. A pair of locking rods 21 extend outward from each of said opposed faces 16 substantially perpendicular to said faces 16. Each pair of locking rods 21 may support a locking strap 23, as best shown in FIGS. 4 and 5. The locking strap 23 is maintained against the locking plate 22, which in turn bears on the closed end 12 of the canister 11 to maintain the canister open flanged end 13 in fluid tight relation with the adjacent head portion opposed face 16. A head gasket 17 is preferably placed between the opposed face 16 and the canister open flanged end 13 to insure a fluid tight seal. Each head portion opposed face 16 may have an extended portion 74 adapted to extend within the canisters 11 to position the canisters with respect to the opposed faces 16.

Figure 2:
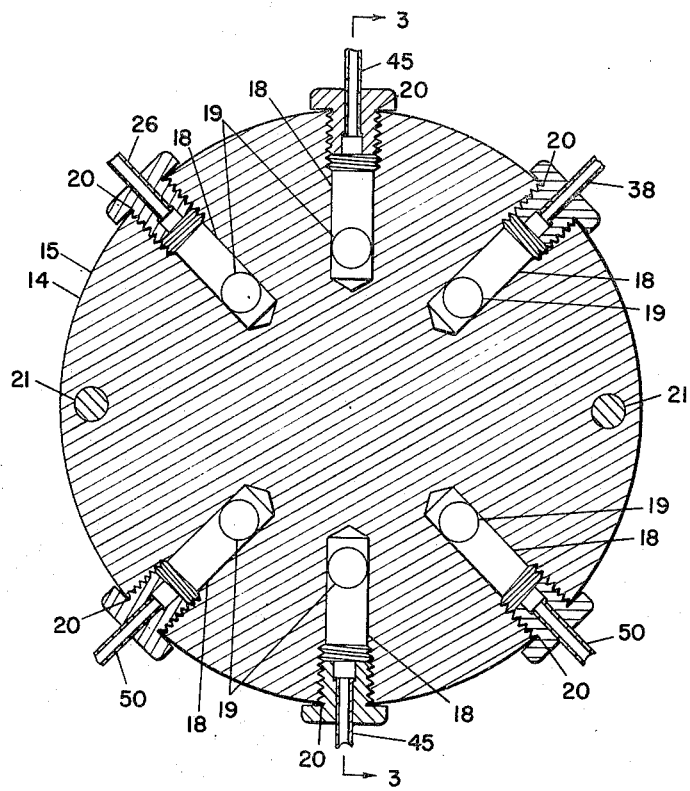
FIG. 2 is a section view of the head portion of my invention taken along section line 2—2 of FIG. 1.

The head portion 14 has a plurality of independent passages 18 extending generally radially inward from the outer surface 15 to terminate in communication with inner openings 19 extending to both opposed faces 16 of the head portion 14. Inner openings 19 are in communication with the inside of the opposed canisters 11. The outer openings 20 of the head passages 18 are threaded to provide easy connection with threaded conduits. FIG. 2 shows six head passages 18, which is the number of passages necessary for conventional operation of my mixing device.

Figure 1:
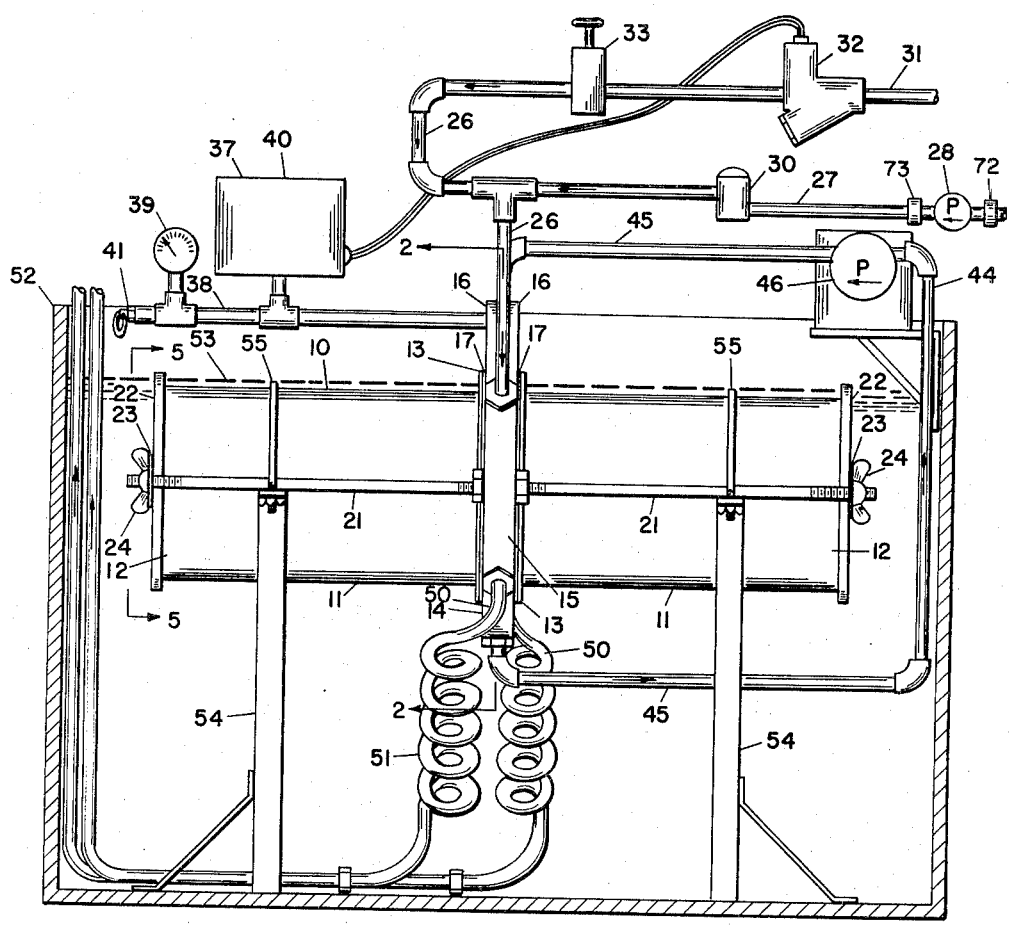
FIG. 1 is a side elevational view of my invention immersed in a cooling tank with the near side of the tank removed.

Inlet conduit 26, shown in FIGS. 1 and 2, is attached to one of the conduit outer openings 20 in threaded relation, and provides an inlet for the liquids to enter the opposed canisters 11. A first liquid supply line 27 and a second liquid supply line 31 are in communication with the inlet conduit 26. The first liquid supply line 27 may extend from a conventional concentrate blending unit (not shown) such as is described in my United States Patent No. 3,045,985, issued January 24, 1962. The first supply line 27 contains a motor driven pump 28 at some convenient location between the blending unit and the inlet conduit 26. A pair of reducing valves 72 and 73 are placed in the first supply line on opposite sides of the pump 28 to provide a substantially constant flow of blended concentrate at relatively high pressures from the blending unit to the inlet conduit 26. As described in my above-mentioned patent, such reducing valves 72 and 73 essentially comprise orifices of preferably equal size to insure a constant flow rate with no surges, and provide almost constant uniformity. While the exact size of these orifices will vary with the size of the supply line 27, it has been found that when the line consists of ⅝ inch tubing orifices of $7/64$ inch in diameter are satisfactory. First supply line 27 may also preferably include a one way back pressure valve 30 between the pump 28 and the inlet conduit 26. The one way valve 30 permits flow from the pump 28 to the inlet conduit 26, but prevents the backward flow of liquid from the inlet conduit toward the pump 28.

The second liquid supply line 31 preferably includes a constant flow valve 32, which may be solenoid operated for the purpose of positive control, and a relatively accurate metering valve 33 located between the constant flow valve 32 and the inlet conduit 26. The constant flow valve 32 should be such that it provides for substantially constant quantity of flow over a relatively wide range of liquid pressures. The metering valve 33 may be used, when desired, to reduce the flow through the second supply line 31 to a lower level than that provided by the constant flow valve 32. Since the constant flow valve 32 will equalize the flow for widely varying fluid pressure, the metering valve 33 may include a needle valve mechanism.

The first liquid supply line 27 and the second liquid supply line 31 are preferably directed into the inlet conduit 26 to achieve a partial mixing of the first liquid and the second liquid. The liquid so mixed is then directed by the inlet conduit into the communicating head passage 18 and the opposed canisters 11 through an inner opening 19. In normal operations the first supply line 27 will deliver a blended concentrate such as root beer concentrate to the inlet conduit 26. The second supply line 31 may be connected to the normal building water system to supply water to the inlet conduit. It is, of course, within the principles of my invention to modify the arrangements of parts shown in FIG. 1 to provide a much more compact unit.

Figure 3:
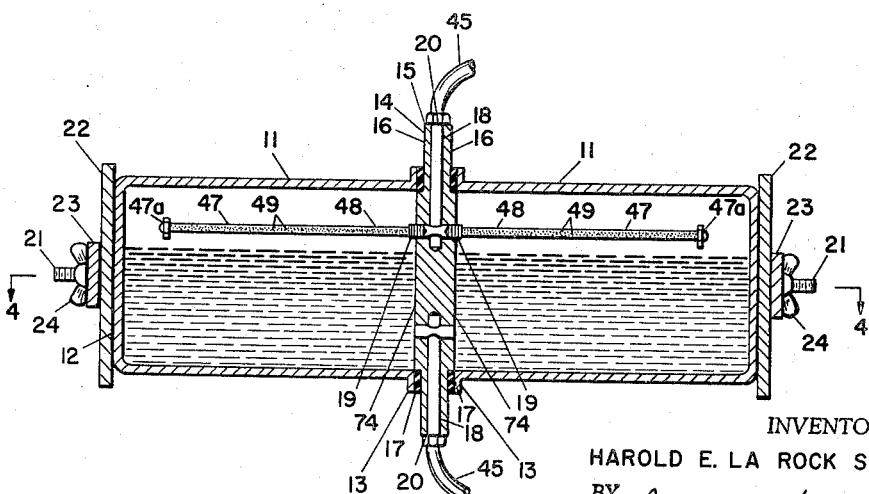
FIG. 3 is a section view of the head portion and attached tank members of my invention taken along section line 3—3 of FIG. 2.

My mixing device 10 also includes a recirculation system 44 having a recirculation line 45, a pump 46 and twin distributors 47. The recirculation line 45 extends from a head passage 18 having an inner opening 19 located below the liquid level inside the canisters 11, as shown in FIG. 3, and terminates at a head passage 18 having an inner opening 19 located above the liquid level within the canisters 11. The recirculation pump 46 may be located along the recirculation line wherever convenient. The distributors 47 may be threadedly connected to the upper passage inner openings 19 such that a distributor 47 extends outward from each opposed face 16 above the liquid level within the canisters 11. The distributors 47 are preferably of tubular construction and have a plurality of restricted openings 49 extending through the walls of the distributor. The outer end 47a of the distributor is closed to prevent liquid flow therethrough, and to cause the recirculated liquid to be forced outwardly through the needle hole-like restricted openings 49 of the distributor.

The solenoid operated constant flow valve 32, supply pump 28 and recirculation pump 46, are all preferably controlled by means of pressure actuated switch 40. FIGS. 1 and 2 show a pressure line 38 extending from a head passage 18 having inner openings 19 preferably above the liquid level within the canisters 11. Pressure switch 40, pressure gage 39, and pop-off valve 41 are located on the pressure line 38 in pressure responsive communication with the atmosphere within the canisters 11. When the pressure within the canisters 11 reaches a predetermined low level, the pressure switch is actuated, thereby opening solenoid controlled valve 32 and actuating motor driven pumps 28 and 46, to deliver partially mixed liquid to the canisters 11, and to recirculate and redistribute the delivered liquids within the canisters 11 to achieve a more complete mixing thereof. The operating pressure within the canisters 11 may vary, depending on the use of my device. Typical high and low pressure levels are 22 and 2 p.s.i., respectively. The exact values will vary with the conditions and the setting of the pressure switch 40.

Liquid removal lines 50 are threadedly connected to the remaining head passage outer openings 20 for removal of the mixed liquids from the canisters to a conventional carbonator for carbonation prior to use as a beverage. If carbonation of the mixture is not necessary, it may be removed directly from consumption by the customer. As shown in FIG. 1, the liquid removal lines 50 may include a length of coiled tubing 51 having relatively high heat conducting properties. FIG. 1 further shows the head portion 14 and canisters 11 of my device located in submerged position within a cooling tank 52 which contains a supply of cooling liquid 53, such as water. When the canisters 11 are so submerged, the liquid within the canisters and the tubing 51 will be maintained at approximately the same temperature as that the cooling liquid 53. When the liquid is so cooled a better product is provided to the customer. Such refrigeration produces better carbonation, as there is a greater absorption of carbon dioxide. The product is not as "wild" and foamy when so refrigerated, and the customer gets his money's worth.

FIG. 1 shows typical tank support members 54 extending from the floor of the tank 52 to the canisters 11 and the locking rods 21 in supporting relation. Restraining straps 55 extend over the top of the canisters 11 to prevent the device from rising as the mixed liquid is removed from the canisters. It is, of course, obvious that many different configurations for the tank supports 54 are permissible within the principles of my invention.

FIG. 4 shows a modification of my mixing device 10 which is adapted for table top or counter installation, and does not need to be submerged to provide adequate cooling for the beverage product. Elements in FIG. 4 corresponding to elements in FIGS. 1 to 3 carry the same reference numbers plus the reference letter "a." My modification includes internal refrigeration coils 56 extending from the head portion 14a into each of the canisters 11a below the level of the mixed liquid contained therein. The illustrated refrigeration coils 56 are seen to be generally U-shaped to extend within the canisters 11a in spaced relation thereto. However, coils of any desired shape may be provided within the canisters 11a to achieve the desired degree of cooling. When such a modified cooling system is used, the head portion 14 illustrated in FIG. 2 will have two additional passages 18 extending inward from the outer surface 15 with inner openings 19 located below the level of the liquid within the canisters 11. In addition, a refrigeration system 57 will be connected to the added passages 18 to supply the necessary refrigerant to the internal refrigeration coils 56. FIG. 4 shows a refrigeration system 57 having a conventional refrigeration line 58 and a refrigeration unit 59 of suitable characteristics.

The novel mixing device 10 herein illustrated and described has many important advantages over previously known mixers. In operation, my device 10 provides a uniformly mixed beverage product which may be drawn from the canisters 11 and delivered to faucets attached to liquid removal lines 50 in relatively large amounts. In normal use, each of the two liquid removal lines 50 shown in FIG. 1 may supply two faucets. As previously described, each of the head passages 18 to which the liquid removal lines 50 are attached has an inner opening 19 in communication with both canisters 11. When it is only necessary to operate one faucet from either or both of the liquid removal lines 50, one of the inner openings 19 of the head passage 18 through which said liquid removal line 50 is attached may be plugged by means of a conventional threaded plug (not shown). However, such a plug is not necessary for satisfactory operation of my device when only one faucet per liquid removal line 50 is employed.

Figure 6:
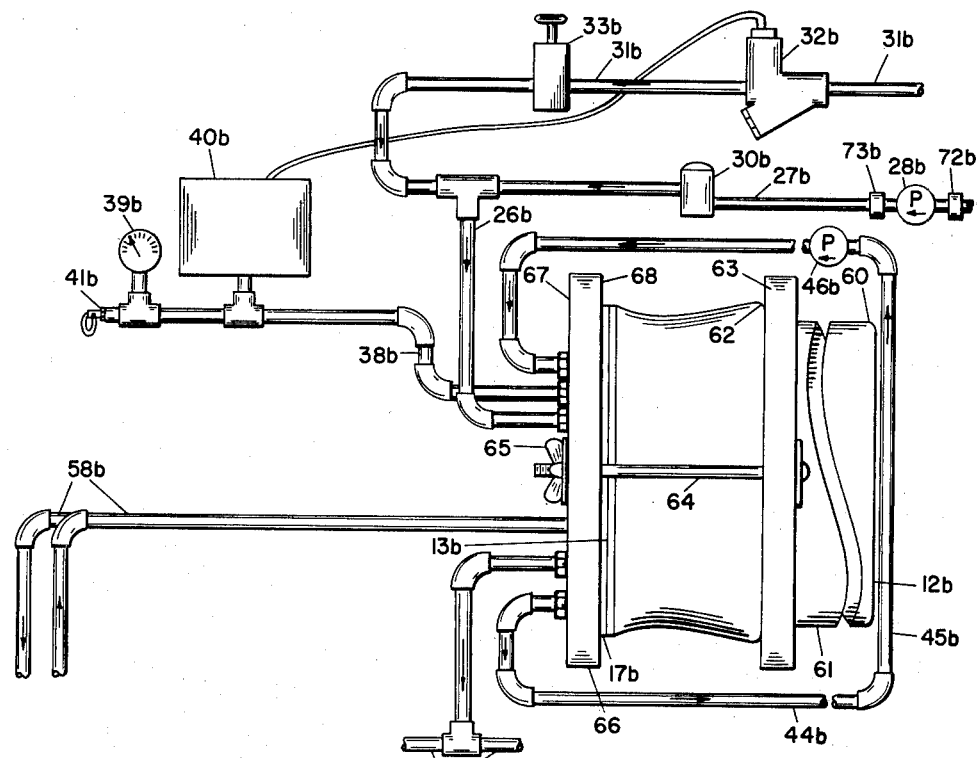
FIG. 6 is a side elevational view of a modification of my invention.
Figure 7:
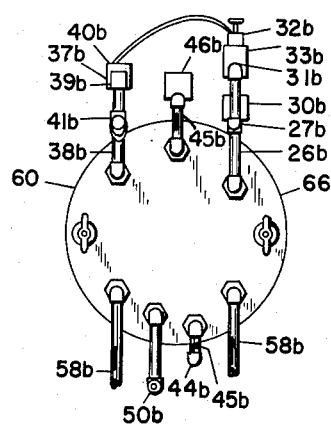
FIG. 7 is an end view of the modification of FIG. 6 showing the modified head portion.

FIGS. 6 and 7 show a modified mixing device 60 which employs only one canisters 61. Elements in FIGS. 6 and 7 corresponding to elements in FIGS. 1 to 3 carry the same reference numbers plus the reference letter "b." The modified device 60 shown in FIGS. 6 and 7 has a modified single head portion 66 with an outer face 67 and an inner face 68. The head portion passages (not shown) may extend from the inner face 68 to the outer face 67 as in the modified device 60 shown. The modified device 60 also employs a modified canister 61 having a shoulder section 62. The modified canister 61 may be maintained in fluid tight relation with the modified head portion inner face 68 by means of a circular locking collar 63, locking bolts 64 and locking nuts 65. The locking bolts 64 maintain the collar 63 in tight relation against the canister shoulder section 62. The operation of the modified device 60 is exactly the same as that of the two-canister device 10 previously described.

It is, of course, obvious that the modified canisters 61 and locking collar 63 may be used with the standard head portion 14 in either a single or double canister mixer, and that the standard canisters 11, locking rods 21, locking plates 22 and locking strap 23 may be used with modified head portion 61. The standard head portion 14 may be adapted for use with a single canister by plugging all the passage inner openings 19 to one opposed face, or by plugging the passage outer openings 20 and attaching the various conduits to the passage inner openings 19 at the head portion face 16 opposite that to which the single canister 11 is attached, in the manner shown in the modification 60 of FIGS. 6 and 7.

As previously mentioned, an important advantage of my liquid mixing device 10 lies in its compactness. The canisters 11 themselves may be quite small, typical dimensions being approximately 4 to 8 inches in diameter and 9 to 12 inches in length. While the supply lines and recirculation system are, for purposes of clarity, shown in FIG. 1 and FIG. 6 to be quite spread out, in the actual construction of my device 10 such elements are arranged in close proximity to the head portion 14 and canisters 11. It is obvious that the supply lines and the recirculation line may be of flexible tubing or of rigid tubing which may be easily bent to the desired shape. When it is desired that the mixing device 10 be submerged for the purposes of refrigeration the controls should be located above the water line. However, when internal refrigeration of the type shown in FIG. 4 is employed, the controls may be closely grouped around the head portion and canisters as desired, to make an extremely compact unit. The single canister modified mixer 60 of FIGS. 6 and 7 may contain internal refrigeration, as shown, and is especially well adapted to compact construction.

An additional feature of my invention, which is extremely important from a health standpoint, is its adaptability to cleaning. Whereas conventional mixing units in operation today require considerable time to clean and in actual use are usually not cleaned as often as would be desirable, my device may be cleaned in a matter of minutes, and is adapted to daily cleaning. When it is desired to clean my device 10 after a day of operation, the cooling tank 52 is drained of water and the restraining straps 55 are quickly removed. Next the locking nuts 24 are loosened on the locking rods 21 to permit removal of the locking plates 22, and the canisters 11 may be removed from engagement with the head gasket 17. It is desirable that the recirculation distributors 47 are of a semi-flexible material such as plastic to allow some bending to facilitate removal of the canisters. The distributors 47 may then be easily removed from the head portion 14, and the head portion 14, the distributors 47 and the canisters 11 may be quickly and easily cleaned. In addition, the head portion inner openings 19 may also be easily cleaned at this time. When desired the connector elements attached to the head passage outer openings 20 may also be removed to permit cleaning of the head passages 18. When the device 10 has been completely cleaned, it may be quickly reassembled and is ready for use. The modified mixer of FIGS. 6 and 7 may be similarly quickly cleaned and assembled. It should be noted that with the relatively small canisters employed by my device, very little loss of beverage product will result from disassembly for cleaning. In conventional units wherein relatively large amounts of the beverage product must be premixed and held prior to use, considerable amounts of the beverage product may be lost during disassembly and cleaning. The operator of such a unit is often discouraged by such losses from cleaning his unit as often as he should. It should also be noted that the laws of the various states are becoming increasingly strict with regard to the standards of sanitation which must be employed by those in the business of selling beverage products to the public. My device will comply with all known sanitation rules and laws, and will be a great advantage where frequent cleaning of such devices is required by law.

From the standpoint of sanitation and acceptability to the industry, the head portion, canisters and other submerged parts will preferably be made of stainless steel. However, many other materials may be suitable for many uses. Where stainless steel is not required, a molded plastic head portion 14 would be suitable, and would also be less expensive.

It is clear that my novel mixing device may be used to mix any beverages or liquids. It is also obvious that my device may be used to mix and provide heated beverages. In such use, the refrigerated water of the cooling tank 52, or the refrigerant circulated through refrigeration coil 56, may be replaced with properly heated water or liquid to provide a heated beverage of the proper temperature. Other heat sources, such as electrical heating elements located internally within the canisters may also be employed.

It is understood that my invention is not confined to the particular construction and arrangement of parts herein illustrated and described, but embraces all such modified forms thereof as come within the scope of the following claims.

I claim:
1. Apparatus for mixing a first liquid with a second liquid comprising:
 (a) tank means adapted to contain a quantity of liquid,
 (b) a head portion removably connected to said tank means in fixed, substantially fluid-tight relation,
 (c) said head portion having a plurality of independent passages,
 (d) each of said passages having an inner opening in communication with said tank means and an outer opening,
 (e) inlet means connected in substantially fluid-tight relation to selected ones of said outer openings for conducting said first and second liquids into said tank means,
 (f) first supply means for conducting said first liquid to said inlet means at substantial pressure,
 (g) second supply means for conducting said second liquid to said inlet means simultaneously with said first liquid,
 (h) recirculation means connected in substantially fluid tight relation to selected ones of said outer openings for continuously removing a quantity of said mixed liquids from said tank means and redistributing said liquids within said tank means to provide substantially uniform mixing,
 (i) control means for said first and second supply means and said recirculation means connected in substantially fluid tight relation to selected ones of said outer openings to maintain said mixed liquids above a predetermined level in said tank means and to provide substantially uniform mixing of said liquids, and
 (j) means connected in substantially fluid tight relation to selected ones of said outer openings for removal of said mixed liquids from said tank means.
2. The invention described in claim 1 wherein:
 (a) said tank means includes a pair of opposed canisters, each of which has an open flanged end and a closed end,
 (b) said head portion has an outer surface and a pair of opposed faces,
 (c) said canister flanged ends are maintained in substantially fluid-tight relation to said head portion opposed faces by suitable locking means, and
 (d) said head passage inner openings are in communication with each of said canisters, and said passage outer openings are located at said head outer surface.
3. Apparatus for mixing liquids comprising:
 (a) a head portion having an outer surface and a pair of opposed faces,
 (b) said head portion having a plurality of independent passages extending from said opposed faces to said outer surface,
 (c) a pair of rigid canisters, each having a closed end and an open flanged end and adapted to contain a quantity of fluid,
 (d) locking means for maintaining said canister flanged ends in removable, substantially fluid-tight relation to said head portion opposed faces,
 (e) said head passages opening on said opposed faces in communication with said canisters,
 (f) inlet means in communication with a selected said head passage for conducting fluid into said canisters,
 (g) first supply means for conducting a first liquid to said inlet means at substantial pressure,
 (h) second supply means for conducting a second liquid to said inlet means simultaneously with said first liquid to mix said liquids,
 (i) recirculation means in substantially fluid-tight communication with selected said head portion passages whereby to continuously remove a quantity of said mixed liquids from said canisters and to redistribute said mixed liquids within said canisters to provide substantially uniform mixing thereof,

(j) pressure actuated control means in pressure responsive communication with a selected said head passage and said canisters whereby to operate said first and second supply means and said recirculation means when the pressure within said canisters reaches a predetermined low level, and to discontinue said operation when the pressure in said canisters reaches a predetermined high level, (k) means in communication with the remaining said head passages for removal of said mixed liquid from said canisters.

4. The invention described in claim 3 wherein said head portion passages may be closed to one of said head portion opposed faces whereby to permit use of said apparatus as a single canister liquid mixer.

5. The invention described in claim 3 wherein:
(a) said head portion and said attached canisters are adapted to be immersed in liquid of controlled temperature, and
(b) said means for removal of said mixed liquids from said canister includes means for conducting said mixed liquids through said liquid of controlled temperature in heat exchanging relation.

6. The invention described in claim 3 wherein:
(a) refrigerant conductor means extend within said canisters from selected head portion passages in heat exchangeable relation, and
(b) refrigeration means are connected to said head passages in communication with said refrigerant conductor means whereby to maintain said mixed liquids within said canisters at a selected low temperature.

7. The invention described in claim 3 wherein heater means extend within said canisters in heat exchangeable relation whereby to maintain said mixed liquids within said canisters at a selected high temperature.

References Cited by the Examiner

UNITED STATES PATENTS

| | | | |
|---|---|---|---|
| 838,217 | 12/06 | Schwingel et al. | 137—565 |
| 1,435,883 | 11/22 | Spohn | 99—275 |
| 2,312,201 | 2/43 | Thompson et al. | 137—386 X |
| 2,699,718 | 1/55 | Wright | 99—275 |
| 2,778,720 | 1/57 | St. Clair et al. | 137—505.12 X |
| 2,915,023 | 12/59 | Rapaport | 259—95 X |

ROBERT E. PULFREY, *Primary Examiner.*

JEROME SCHNALL, *Examiner.*